United States Patent
Kim

(10) Patent No.: US 7,683,279 B2
(45) Date of Patent: Mar. 23, 2010

(54) LIGHT EMITTING KEYPAD COMPRISING LIGHT GUIDE FILM AND LIGHT GUIDE

(76) Inventor: Hyun Soo Kim, Wilson & Ham, PMB: 348, 2530 Berrvessa Rd., San Jose, CA (US)

(*) Notice: Subject to any disclaimer, the term of this patent is extended or adjusted under 35 U.S.C. 154(b) by 0 days.

(21) Appl. No.: 12/280,036

(22) PCT Filed: Sep. 29, 2005

(86) PCT No.: PCT/KR2006/003942

§ 371 (c)(1),
(2), (4) Date: Aug. 20, 2008

(87) PCT Pub. No.: WO2007/100180

PCT Pub. Date: Sep. 7, 2007

(65) Prior Publication Data

US 2009/0050456 A1   Feb. 26, 2009

(30) Foreign Application Priority Data

Feb. 28, 2006   (KR) .................. 10-2006-0019199

(51) Int. Cl.
*H01H 13/83* (2006.01)
(52) U.S. Cl. ..................... 200/310; 200/314
(58) Field of Classification Search .......... 200/512, 200/310–317, 341, 329; 341/20, 22, 23, 341/28; 345/156, 168–171, 173, 176
See application file for complete search history.

(56) References Cited

U.S. PATENT DOCUMENTS

| | | | |
|---|---|---|---|
| 5,128,842 A * | 7/1992 | Kenmochi | 362/95 |
| 7,053,799 B2 * | 5/2006 | Yu et al. | 341/31 |
| 7,294,803 B2 * | 11/2007 | Lee et al. | 200/314 |
| 7,378,606 B2 * | 5/2008 | Lee et al. | 200/314 |
| 7,411,142 B2 * | 8/2008 | Jung et al. | 200/314 |
| 7,423,229 B2 * | 9/2008 | Chen | 200/314 |
| 7,455,416 B2 * | 11/2008 | Chen | 362/85 |
| 7,462,794 B2 * | 12/2008 | Lee et al. | 200/314 |
| 7,488,910 B2 * | 2/2009 | Hong | 200/310 |
| 7,503,683 B2 * | 3/2009 | Liu | 362/616 |
| 7,523,544 B2 * | 4/2009 | Hsu | 29/622 |

FOREIGN PATENT DOCUMENTS

| | | |
|---|---|---|
| JP | 2002131555 A1 | 5/2002 |
| JP | 2003255346 A1 | 9/2003 |
| JP | 2004127810 A | 4/2004 |
| JP | 2004253308 A1 | 9/2004 |

* cited by examiner

*Primary Examiner*—Michael A Friedhofer

(57) ABSTRACT

The present invention provides a light emitting keypad having a very slim light guide film, and a light guide film for a keypad backlight. Particularly, a reflection layer is formed on a lower portion of the light guide film, resulting in more improved luminance. According to the present invention, the introduction of an EL sheet is eliminated, substantial slimness is achieved as compared with a direct illumination type keypad, high luminance is obtained by introducing a reflection layer even though a small number of light sources are used, and a light emitting surface can be provided for intensive light emission onto key regions of a keypad by forming a predetermined pattern on at least one surface of the light guide film.

13 Claims, 4 Drawing Sheets

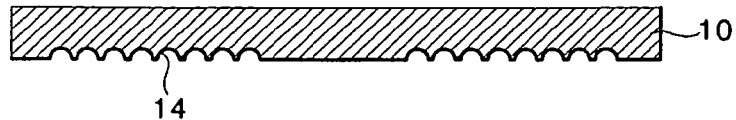
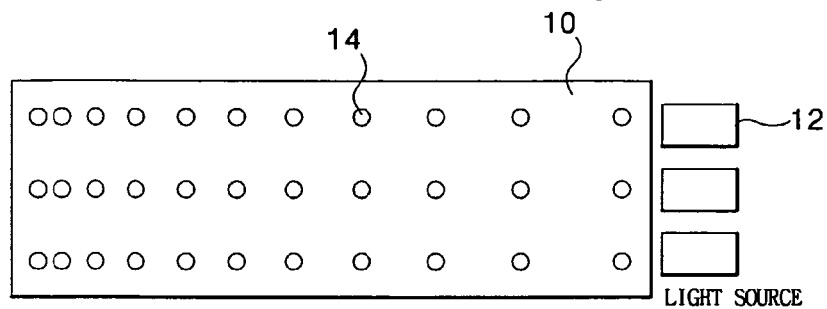
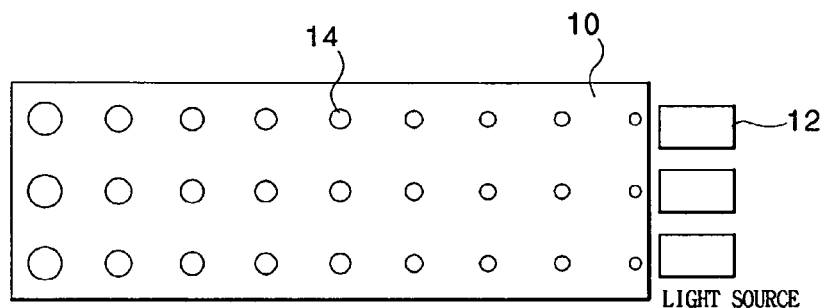
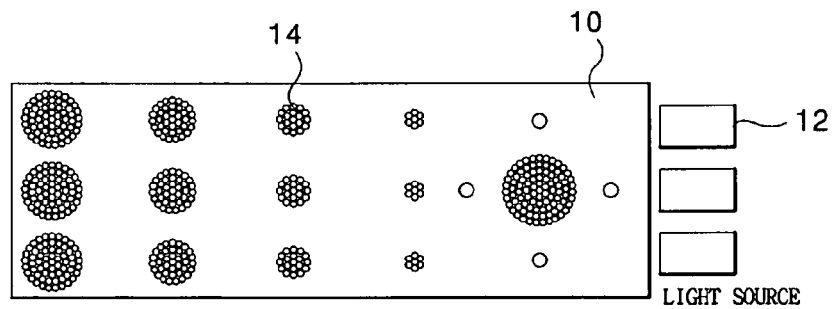
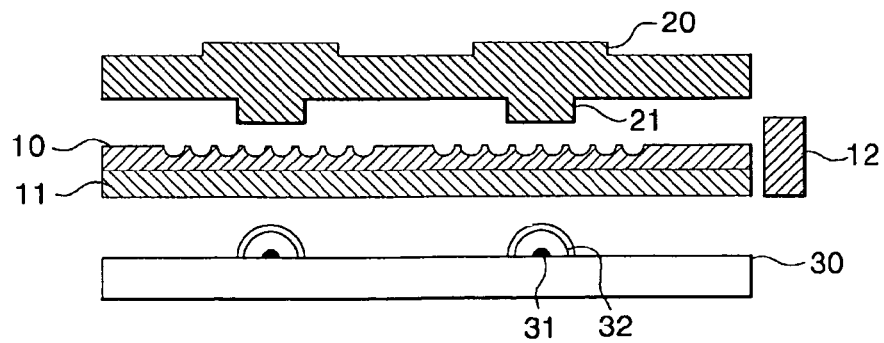

LIGHT EMITTING KEYPAD COMPRISING LIGHT GUIDE FILM AND LIGHT GUIDE

TECHNICAL FIELD

The present invention relates to a light guide film for a keypad backlight and a light emitting keypad having the same.

BACKGROUND ART

In general, a light emitting keypad is applied to communication equipment such as a mobile phone so that the light emitting keypad is used as a switch device for generating a signal or performing various additional functions. The light emitting keypad has the function of enabling identification of numeral or character keys in the nighttime or at a dark place. Recently, an ultra-thin light emitting keypad has been developed and employed as mobile phones become thinner.

FIG. 1 is a sectional view of a conventional direct illumination type LED (Light Emitting Diode) keypad that comprises a printed circuit board (100), domes (102), direct illuminating LEDs (103), and a keypad portion (104). The printed circuit board (100) has contact terminals (101). Here, the plurality of domes and direct illuminating LEDs are installed on a front surface of the printed circuit board. The keypad potion that has numerals or characters printed on an upper surface thereof and protrusions (105) formed on a lower surface thereof is installed in front of the domes and the direct illuminating LEDs.

In this direct illumination type LED keypad, the keypad portion is illuminated by light emitted from the direct illuminating LEDs installed on the front surface of the printed circuit board. That is, when a user presses a key of the keypad portion, a protrusion corresponding to the key of the keypad portion allows a corresponding dome to be connected to a corresponding contact terminal of the printed circuit board to generate a predetermined electrical signal. The generated electrical signal causes a corresponding LED to emit light so that the keypad portion can be directly illuminated by the LED in the form of a point light source.

However, the aforementioned direct illumination type LED keypad is manufactured to be relatively thicker since it is impossible to fabricate a thin keypad due to characteristics of the LEDs. Furthermore, the direct illumination type LED keypad may reduce a use time of a battery since power consumption increases according to light emission of the LEDs. Furthermore, there is difficulty in designing the direct illumination type LED keypad since light emission uniformity may be irregular in accordance with the arrangement positions of the LEDs.

FIG. 2 is a sectional view of a conventional EL (Electroluminescence) type light emitting keypad for solving the aforementioned problems. The EL type light emitting keypad comprises key tops (110), an EL metal dome sheet (120) and a printed circuit board (130). The EL metal dome sheet (120) comprises an EL sheet (121), metal domes (123) and a base tape (122), thereby achieving ultra-slimness and low power consumption.

As for the function of this EL type metal dome keypad, when a user presses the key top (110), a protrusion (111) disposed on a back surface of the key top (110) causes the metal dome (123) to be brought into contact with a fixed contact terminal (131) of the printed circuit board (130) so that the keypad is switched on and operated.

However, in the conventional EL type light emitting keypad, there is a high risk that the EL sheet may be damaged or broken since the EL sheet (121) is consecutively pressed and impacted by the protrusion (111), and thus, a severe problem of degradation of the reliability of EL is caused and there is also a problem in that a click feeling of the keypad is deteriorated. Furthermore, the conventional EL type light emitting keypad has problems in that the EL sheet has a life span shorter than that of an LED due to characteristics of the EL sheet, noise is produced in an LCD module, and reliability is lowered. Moreover, the conventional EL type light emitting keypad has a problem in that production costs increase as compared with manufacture of an LED keypad.

DISCLOSURE OF INVENTION

Technical Problem

In order to solve the aforementioned problems, it may be contemplated that an indirect illumination type LED light source is prepared and an optical fiber with superior optical transmission characteristics for uniformly supplying light to a keypad is installed. However, since the optical fiber is essentially made of silicone, there are problems that it is difficult to make the optical fiber thin, and it is difficult to actually apply the optical fiber to the keypad.

The present invention is conceived to solve the problems in the prior art. An object of the present invention is to provide a light guide film for a keypad backlight, wherein substantial slimness is achieved as compared with a direct illumination type keypad, the introduction of an EL sheet is eliminated to solve problems in an EL type keypad, high luminance is obtained by introducing a reflection layer even though a small number of light sources are used, and a light emitting surface can be provided for intensive light emission onto key regions of a keypad by forming a predetermined pattern on at least one surface of the light guide film, and a light emitting keypad having the light guide film.

Technical Solution

The present invention for achieving the object provides a light emitting keypad comprising a key plate with a plurality of keys formed thereon; a back layer disposed below the key plate and having a plurality of protrusions corresponding to all or some of the keys; a light guide film formed below the back layer to cause incident light from a side light source to be surface-emitted; and a substrate disposed below the light guide film and having dome switches formed at positions corresponding to the positions of the protrusions, wherein the light guide film is a slim film with a thickness in a range of 50 to 250 μm.

Further, in the light emitting keypad of the present invention, a reflection layer may be formed on a lower portion of the light guide film, and patterns may be locally formed in specific regions on at least one of front and back surfaces of the light guide film so that light is intensively supplied to predetermined regions of the keypad.

Moreover, the present invention provides a light emitting keypad comprising a key plate with a plurality of keys formed thereon; a back layer disposed below the key plate and having a plurality of protrusions corresponding to all or some of the keys; a light guide film formed below the back layer to cause incident light from a side light source to be surface-emitted; and a substrate disposed below the light guide film and having dome switches formed at positions corresponding to the positions of the protrusions, wherein a reflection layer is formed on all or a portion of an upper surface of the substrate having the dome switches.

In the light emitting keypad, the light guide film may be a slim film with a thickness in a range of 50 to 250 μm, and patterns may be locally formed in specific regions on at least one of front and back surfaces of the light guide film so that light is intensively supplied to predetermined regions of the keypad.

Furthermore, the present invention provides a light emitting keypad comprising a key plate with a plurality of keys formed thereon; a light guide film disposed below the key plate to cause incident light from a side light source to be surface-emitted; a plurality of protrusions formed at predetermined positions below the light guide film; and a substrate disposed below the protrusions and having dome switches formed at positions corresponding to the positions of the protrusions, wherein the light guide film is a slim film with a thickness in a range of 50 to 250 μm.

In the light emitting keypad, a reflection layer may be formed on a lower portion of the light guide film, and patterns may be locally formed in specific regions on at least one of front and back surfaces of the light guide film so that light is intensively supplied to predetermined regions of the keypad.

In the light emitting keypad, the light guide film may be made of polycarbonate (PC) or polyethylene terephthalate (PET).

In addition, the present invention provides a light guide film for a keypad backlight to cause incident light from a light source to be surface-emitted, wherein the light guide film comprises a reflection layer formed on a lower portion thereof, and patterns are locally formed in specific regions on at least one of front and back surfaces of the light guide film so that light is intensively supplied to predetermined regions of the keypad.

In the light guide film, the light guide film and the reflection layer may be spaced apart by a predetermined distance from each other.

In the light guide film, the light guide film may be a slim film with a thickness in a range of 50 to 250 μm.

In the light guide film, the reflection layer may be formed of a sheet and attached to one side end, both side ends or the entire of the back surface of the light guide film using a double-sided tape.

In the light guide film, the patterns may be formed by means of a hot press method using a mold heated to a temperature in a range of 70 to 150° C.

In the light guide film, the patterns may be formed by means of silk printing using an ink containing a light-scattering material on the light guide film.

In the light guide film, the patterns may have sizes increasing as the patterns go away from the light source.

ADVANTAGEOUS EFFECTS

The present invention has the following advantages resulting from the aforementioned unique constitutions. That is, the present invention provides a light guide film for a keypad backlight, wherein substantial slimness is achieved as compared with a direct illumination type keypad, the introduction of an EL sheet is eliminated to solve problems in an EL type keypad, high luminance is obtained by introducing a reflection layer even though a small number of light sources are used, and a light emitting surface can be provided for intensive light emission onto key regions of a keypad by forming a predetermined pattern on at least one surface of the light guide film, and a light emitting keypad having the light guide film.

BRIEF DESCRIPTION OF THE DRAWINGS

FIGS. 6 and 7 are sectional views showing patterns of a light guide film according to other embodiments of the present invention.

FIGS. 8 to 10 are plan views showing patterns of a light guide film according to other embodiments of the present invention.

FIGS. 11 and 12 are sectional views of light emitting keypads having light guide films according to embodiments of the present invention.

EXPLANATION OF REFERENCE NUMERALS FOR MAIN PORTIONS IN DRAWINGS

Figure 1:
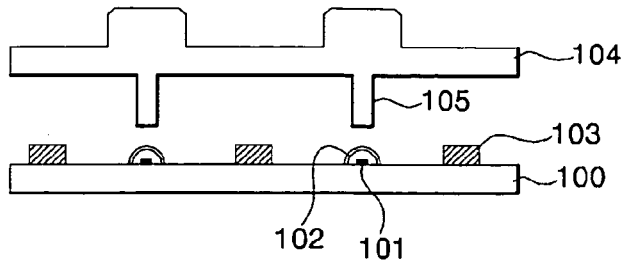
FIG. 1 is a sectional view of a conventional direct illumination type LED light emitting keypad.
Figure 2:
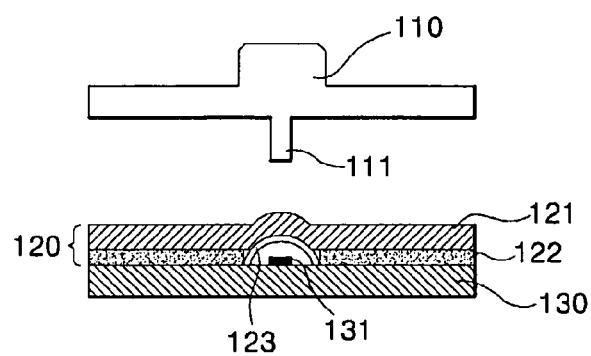
FIG. 2 is a sectional view of a conventional EL type light emitting keypad.

10: Light guide film 11: Reflection layer
12: Light source 13: Double-sided tape
14: Pattern 15: Adhesive member
20: Key 21: Protrusion
22: Key plate 23: Back layer
30: Substrate 31: Contact terminal
32: Metal dome

BEST MODE FOR CARRYING OUT THE INVENTION

Hereinafter, the present invention will be described in detail with reference to the accompanying drawings.

First, a light guide film for a keypad backlight according to the present invention will be explained.

Figure 3:
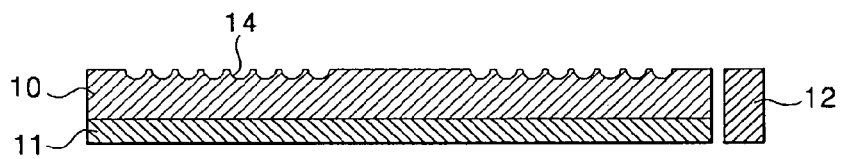
FIGS. 3 to 5 are sectional views of a light guide film according to an embodiment of the present invention.
Figure 4:
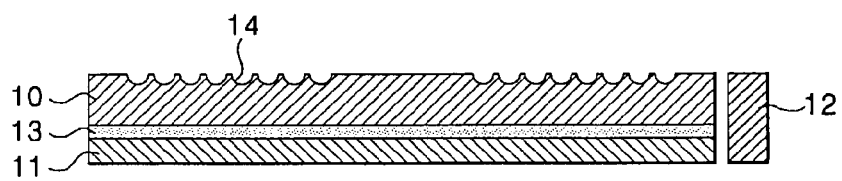
Figure 5:
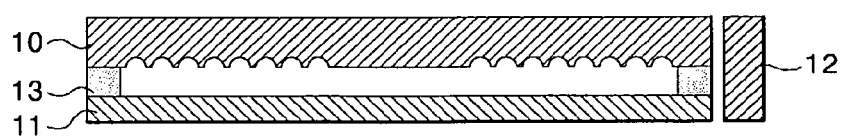

FIGS. 3 to 5 are sectional views of a light guide film according to an embodiment of the present invention. The light guide film for a keypad backlight is to allow light incident from a light source (12) to be surface-emitted and is characterized in that a reflection layer (11) is formed on a lower portion of the light guide film (10), and patterns (14) are locally formed in specific regions on at least one surface of front and back surfaces of the light guide film (10) so that light is intensively supplied to predetermined regions of the keypad.

As can be understood from the term, the light guide film (10) is characterized by a slim film, and preferably has a thickness in a range of 50 to 250 μm contrary to a conventional light guide plate. In case of the conventional light guide plate, the large thickness of the conventional light guide plate deteriorates a click feeling and is contrary to a tendency to slimness of a light emitting keypad. The light guide film has low light emitting efficiency if the thickness of the light guide film is less than the thickness range, whereas a click feeling of the light guide film may be deteriorated and it may be difficult to achieve slimness of the light guide film if the thickness of the light guide film is greater than the thickness range.

The light guide film (10) is preferably made of a material that is slim and has a superior light guiding property and superior physical properties. The material is preferably selected from, but not limited to, polycarbonate (PC) and polyethylene terephthalate (PET).

When the light guide film is a slim film as above, the light guide film may have lower light emitting efficiency as compared with a relatively thicker light guide plate. To solve this problem, it is preferred that a reflection layer (11) for reflecting light, which may be lost, be provided on a lower portion of the light guide film.

The material of the reflection layer (11) may be selected, without limitation, from any materials so far as the materials can reflect light, wherein a white pigment and the like can be used solely or in a paste form. It is preferred that the material of the reflection layer be at least one selected from silver (Ag), titanium dioxide ($TiO_2$), zinc oxide (ZnO), barium sulfate ($BaSO_4$), zinc sulfide (ZnS), lead white and antimony oxide ($Sb_2O_3$).

The reflection layer may be formed on a back surface of the light guide film by a deposition method, a coating method, a printing method or the like. Since the deposition method, the coating method and the printing method are well known, detailed descriptions thereof will be omitted.

As illustrated in FIGS. 4 and 5, the reflection layer is preferably formed of a sheet containing a reflecting material and is more preferably formed by attaching the sheet to one end or both ends or the entire of the back surface of the light guide film using a double-sided tape (13).

The reflection layer may be in fully close contact with or spaced apart by a predetermined distance from the light guide film. A method of causing the reflection layer to be spaced apart by the predetermined distance from the light guide film can be performed by bonding the reflection layer to one end or both ends of the light guide film using a double-sided tape (13) with a predetermined thickness, as illustrated in FIG. 5. That is, when the reflection layer is bonded to only one end or both ends of the light guide film, a predetermined gap corresponding to the thickness of the double-sided tape is produced between the reflection layer and the light guide film at other portions of the light guide film except the one end or both ends of the light guide film.

Once the reflection layer is lengthened than the light guide film and ends of the reflection layer are then bonded to the light guide film, if necessary, the gap may be further increased as much as an excessive length of the reflection layer. Particularly, since a substrate having convexo-concave dome switches is disposed below the light guide film in case of a light emitting keypad, it is also desirable to sufficiently lengthen the reflection layer such that the reflection layer can be disposed to be in contact with the substrate having the dome switches.

When a gap is produced between the reflection layer and the light guide film, luminance of a light emitting keypad can be improved by allowing the reflection layer to reflect light incident into the gap, thereby emitting the reflected light to the outside through the light guide film.

Furthermore, it is preferred that patterns (14) be locally formed in specific regions on at least one of the front and back surfaces of the light guide film in such a manner that light is intensively supplied to predetermined regions of the keypad. Emitted light is more concentrated in the regions formed with patterns than regions without the patterns. Since it is significant to cause light to be more concentrated into regions of numeral or character keys in case of a keypad, it is desirable to position the patterns to correspond to the key regions.

Although there is no limitation on a method of forming the patterns (14), it is desirable to use a hot press method. Since the light guide film of the present invention is a very slim film, it is not easy to form the patterns by means of injection molding. Furthermore, even in case of the hot press method, the light guide film may be damaged, for example, thermally deformed if a mold heated to a high temperature is used. Therefore, it is desirable to use a mold heated to a temperature in a range at which such damage is not produced. The patterns are preferably formed, without being limited thereto, by means of the hot press method using a mold heated to a temperature in a range of 70 to 150° C.

On the other hand, the patterns may be formed by means of silk printing using an ink containing a light scattering material on the light guide film.

MODE FOR THE INVENTION

Figure 6:
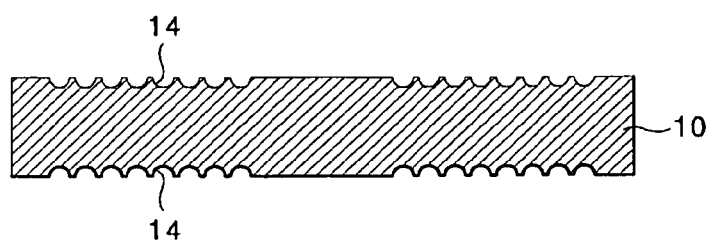

FIGS. 6 and 7 are views showing examples of patterns of a light guide film for a keypad backlight according to other embodiments of the present invention. Although only the formation of concave patterns on a light guide film is shown, the present invention is not limited thereto but may include the formation of convex patterns. Light is refracted and scattered by the patterns so that light can be more efficiently emitted to a keypad.

FIGS. 8 to 10 are views showing examples of patterns (14) of a light guide film for a keypad backlight according to other embodiments of the present invention. As shown in the figures, it is preferred that a pattern is formed such that the pattern has a density increasing as the pattern goes far away from light sources, so as to provide a light emitting surface enabling uniform light emission, which is similar to that at a position closer to the light sources, even at a position far away from the light sources. That is, since the amount of light supplied from the light sources is reduced as the pattern goes away from the light sources, the density of the pattern is increased so that light can be scattered much more, thereby obtaining a more uniform light emitting surface. The density of the pattern may be controlled by adjusting an interval of the pattern, i.e., a pitch of the pattern (FIG. 8). Alternatively, the density of the pattern may be controlled by adjusting the size of the pattern (FIG. 9). On the other hand, an intensive light emitting surface may be provided instead of a uniform light emitting surface by aggregating patterns densely in specific regions to provide more light emission to predetermined regions, e.g., character regions on a keypad (FIG. 10). The configurations of the patterns may be combined with one another. That is, patterns can be formed by combining the interval adjustment, the size adjustment and the degree of concentration with one another. That is, the size of the pattern may be increased as the pattern goes away from the light sources, as shown in FIG. 10.

The shape of the pattern (14) is not limited to a particular shape and the present invention includes patterns formed through machining or printing on a surface of a light guide plate.

A light emitting keypad according to the present invention will be described below.

Figure 12:
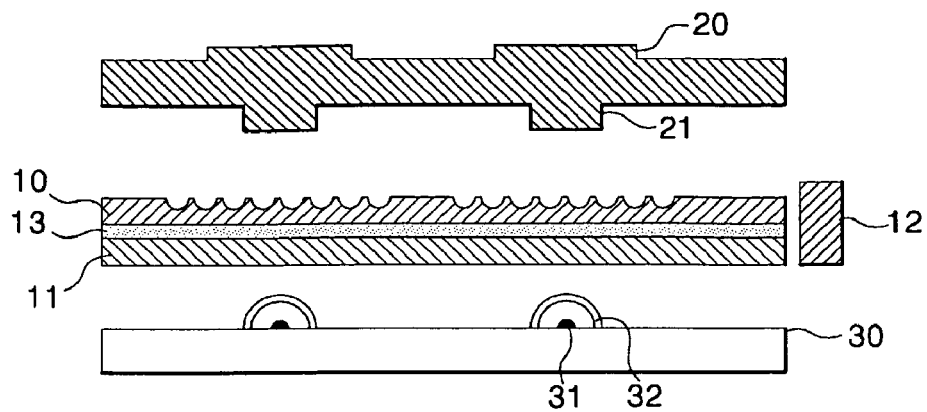

FIGS. 11 and 12 are sectional views of a light emitting keypad according to an embodiment of the present invention.

The light emitting keypad according to the embodiment of the present invention comprises a key plate with a plurality of keys (20) formed thereon; a back layer disposed below the key plate and having a plurality of protrusions (21) corresponding to all or some of the keys (the key plate (22) and the back layer (23) are briefly shown as a single component in FIGS. 11 and 12, and thus, see FIG. 13 specifically showing the key plate and the back layer); a light guide film (10) formed below the back layer to cause incident light from a side light source to be surface-emitted; and a substrate (30)

disposed below the light guide film (10) and having dome switches (31, 32) formed at positions corresponding to the positions of the protrusions (21), wherein the light guide film (10) is a slim film with a thickness in a range of 50 to 250 μm.

It is possible to use a light guide film (10) selectively employing the features of the aforementioned light guide film. That is, a reflection layer (11) is formed on a lower portion of the light guide film (10), and patterns are locally formed in specific regions on at least one of front and back surfaces of the light guide film so that light is intensively supplied to predetermined regions of the keypad.

There is no limitation on a method of positioning the reflection layer (11) on the lower portion of the light guide film (10), and the reflection layer may be bonded to the light guide film using an adhesive (FIG. 11) or a double-sided tape (13) (FIG. 12). Although not shown in the figures, the reflection layer may be bonded to the light guide film such that they are spaced apart from each other, as specifically described above in connection with the light guide film.

The lower protrusions and the light guide film may be spaced apart from each other or brought into contact with each other as shown in the figures.

The key plate (22) can be employed in the light emitting keypad without limitation, and the present invention does not particularly restrict the shape and material of the key plate. That is, as shown in FIGS. 11 and 12, each of keys of the key plate may be formed in a convex shape, in a concave shape, or in a planar shape with a corresponding character or numeral expressed thereon. Since the keys of the key plate are well known in the art, a detailed description thereof will be omitted.

If the keys are made of an integrally formed transparent flat sheet, the keys can be expressed by printing an ink layer on a bottom surface of the key plate, and regions except the keys can be colored by forming a colored deposition layer in the regions.

The back layer (23) has the plurality of lower protrusions (21) and may be formed integrally therewith without limitation. It is preferred that the back layer have excellent restoring force and be made of a material such as silicone or polymer resin.

The plurality of lower protrusions (21) are preferably formed to correspond to the positions of all or some of the keys on the key plate of the light emitting keypad. When a user presses a key, a corresponding lower protrusion is pressed to make electrical connection in a switching part such as a dome switch placed below the light guide film.

Although there is no particular limitation on the light source (12), an LED is most preferred. The LED is proper since it can easily realize colors and fabricated at low costs. The light source is disposed at a side end of the light guide film and thus becomes a side light source, wherein side light emitted from the light source is converted into surface light by the light guide film.

The substrate (30) may be, but not limited to, a printed circuit board (PCB) and has dome switches each of which comprises a metal dome (32) and a contact terminal (31). Therefore, when a user presses a key top on the keypad, a corresponding protrusion formed on the bottom of the key top is pressed and elastically deforms a pressed region of the light guide film so that a corresponding metal dome (32) of the printed circuit board (30) is pressed and then brought into contact with the contact terminal (31).

Figure 13:
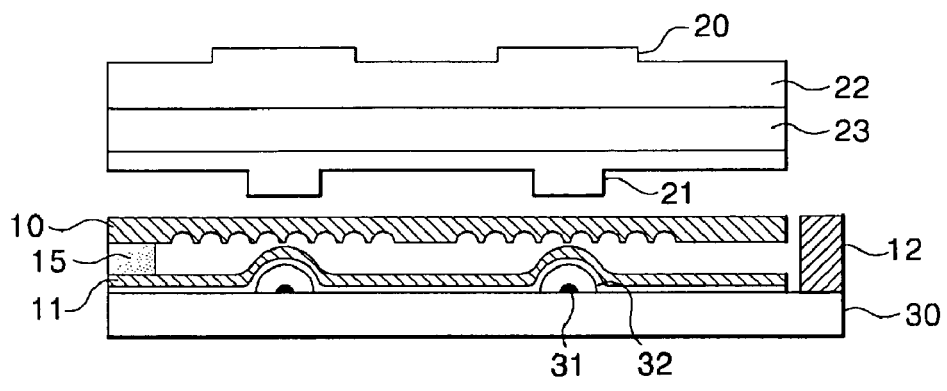
FIG. 13 is a sectional view of a light emitting keypad having a light guide film according to another embodiment of the present invention.

Although the metal domes can be formed separately as shown in FIG. 12, the metal domes may be formed of an integrally manufactured dome substrate as shown in FIG. 13.

FIG. 13 is a sectional view of a light emitting keypad according to another embodiment of the present invention. As shown in FIG. 13, the light emitting keypad comprises a key plate (22) with a plurality of keys (20) formed thereon; a back layer (23) disposed below the key plate (22) and having a plurality of protrusions (21) corresponding to all or some of the keys; a light guide film (10) formed below the back layer (23) to cause incident light from a side light source to be surface-emitted; and a substrate (30) disposed below the light guide film (10) and having dome switches formed at positions corresponding to the positions of the protrusions, wherein a reflection layer (11) is formed on all or a portion of an upper surface of the substrate having the dome switches. Descriptions of parts overlapping with the foregoing description will be omitted.

The reflection layer (11) is preferably bonded to one side end of the light guide film using an adhesion member (15), such as a double-sided tape with a predetermined thickness, so that the light guide film and the reflection film are spaced apart by a predetermined distance from each other, as shown in the figure. Furthermore, although not illustrated in the figure, the reflection layer may be bonded to both side ends of the light guide film or may be formed, separately from the light guide film, on all or a portion of an upper surface of the substrate having the dome switches.

The light guide film may selectively have the features of the aforementioned light guide film if necessary. As preferred examples, the light guide film is a slim film with a thickness in a range of 50 to 250 μm, and patterns are locally formed in specific regions on at least one of front and back surfaces of the light guide film so that light is intensively supplied to predetermined regions of the keypad.

Figure 14:
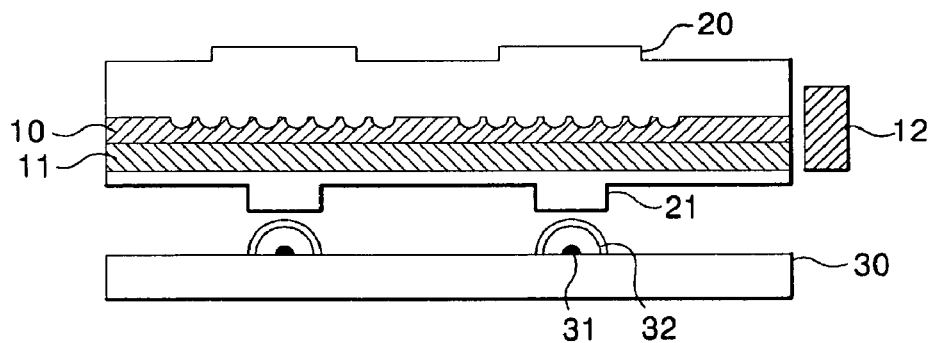
FIGS. 14 to 16 are sectional views of light emitting keypads having light guide films according to other embodiments of the present invention.
Figure 15:
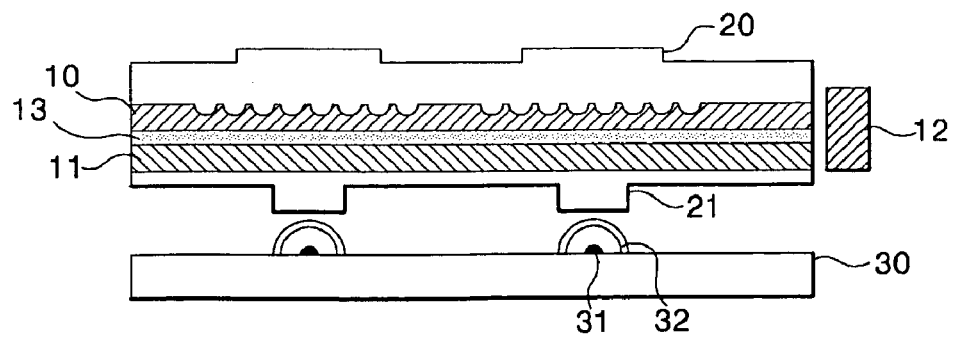
Figure 16:
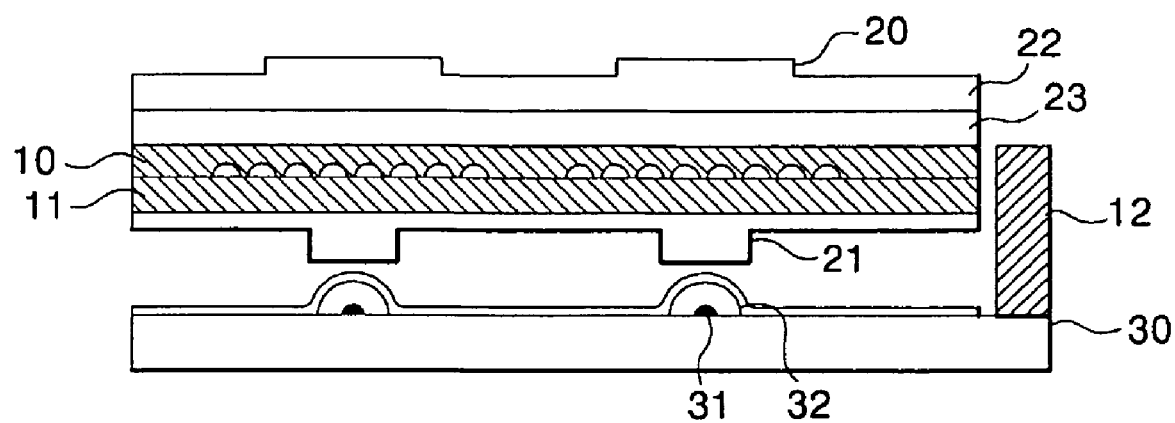

FIGS. 14 to 16 are sectional views of light emitting keypads according to other embodiments of the present invention. As shown in the figures, the light emitting keypad comprises a key plate (22) with a plurality of keys (20) formed thereon; a light guide film (10) disposed below the key plate to cause incident light from a side light source to be surface-emitted; a plurality of protrusions (21) formed at predetermined positions below the light guide film; and a substrate (30) disposed below the protrusions and having dome switches formed at positions corresponding to the positions of the protrusions, wherein the light guide film (10) is a slim film with a thickness in a range of 50 to 250 μm. Descriptions of parts overlapping with the foregoing description will be omitted. A back layer (23) shown in FIG. 16 may be eliminated, if necessary.

The light guide film may selectively have the features of the aforementioned light guide film if necessary. That is, a reflection layer (11) is formed on a lower portion of the light guide film (10), and patterns are locally formed in specific regions on at least one of front and back surfaces of the light guide film so that light is intensively supplied to predetermined regions of the keypad. There is no limitation on a method of positioning the reflection layer (11) on the lower portion of the light guide film (10), and the reflection layer may be bonded to the light guide film using an adhesive (FIG. 14) or a double-sided tape (13) (FIG. 15). Although not shown in the figures, the reflection layer may be bonded to one side end of the light guide film using a double-sided tape with a predetermined thickness such that they are spaced apart from each other, as specifically described above in connection with the light guide film.

In such configurations, the protrusions (21) are formed on the lower portion of the light guide film rather than an upper portion of the light guide film (10). The formation of the protrusions on the upper lower portion of the light guide film reduces a possibility of occurrence of a problem with reliability of the keypad, which is caused by deformation of the light guide film and the patterns formed on the light guide film due to pressing of the protrusions if the protrusions are formed on the upper portion of the light guide film.

The protrusions (21) may be made of a material selected from silicone and a polymer resin.

As for a method of forming the protrusions (21), the protrusions may be formed directly on the light guide film, or formed by attaching a layer with the protrusions formed therein to the back surface of the light guide film. The method of forming the protrusions includes, but not limited to, press molding of liquid silicone or film silicone, a polymer resin, or the like at 100 to 150° C. using a mold formed to correspond to the protrusions (21); photolithography; and screen printing using an UV-curing or an IR-curing ink.

Since the aforementioned embodiments are not for limiting the present invention but for specifically describing the present invention, changes, modifications and elimination made thereto within the technical spirit of the present invention are included in the scope of the present invention defined by the appended claims.

INDUSTRIAL APPLICABILITY

With the light guide film for a keypad backlight and a light emitting keypad comprising the light guide film according to the present invention, substantial slimness is achieved as compared with a direct illumination type keypad, high luminance is obtained by introducing a reflection layer even though a small number of light sources are used, and a light emitting surface can be provided for intensive light emission onto key regions of a keypad by forming a predetermined pattern on at least one surface of the light guide film. Particularly, the light guide film and the light emitting keypad according to the present invention are properly applicable to mobile terminals.

The invention claimed is:

1. A light emitting keypad comprising:
a key plate with a plurality of keys formed thereon;
a back layer disposed below the key plate and having a plurality of protrusions corresponding to all or some of the keys;
a light guide film formed below the back layer to cause incident light from a side light source to be surface-emitted; and a substrate disposed below the light guide film and having dome switches formed at positions corresponding to the positions of the protrusions,
wherein the light guide film is a slim film with a thickness in a range of 50 to 250 μm.

2. The light emitting keypad as claimed in claim 1, wherein a reflection layer is formed on a lower portion of the light guide film, and patterns are locally formed in specific regions on at least one of front and back surfaces of the light guide film so that light is intensively supplied to predetermined regions of the keypad.

3. The light emitting keypad as claimed in claim 1, wherein the light guide film is made of polycarbonate (PC) or polyethylene terephthalate (PET).

4. A light emitting keypad comprising:
a key plate with a plurality of keys formed thereon;
a back layer disposed below the key plate and having a plurality of protrusions corresponding to all or some of the keys;
a light guide film formed below the back layer to cause incident light from a side light source to be surface-emitted; and
a substrate disposed below the light guide film and having dome switches formed at positions corresponding to the positions of the protrusions,
wherein a reflection layer is formed on all or a portion of an upper surface of the substrate having the dome switches.

5. The light emitting keypad as claimed in claim 4, wherein the light guide film is a slim film with a thickness in a range of 50 to 250 μm, and patterns are locally formed in specific regions on at least one of front and back surfaces of the light guide film so that light is intensively supplied to predetermined regions of the keypad.

6. A light emitting keypad comprising:
a key plate with a plurality of keys formed thereon;
a light guide film disposed below the key plate to cause incident light from a side light source to be surface-emitted;
a plurality of protrusions formed at predetermined positions below the light guide film; and
a substrate disposed below the protrusions and having dome switches formed at positions corresponding to the positions of the protrusions,
wherein the light guide film is a slim film with a thickness in a range of 50 to 250 μm.

7. The light emitting keypad as claimed in claim 6, wherein a reflection layer is formed on a lower portion of the light guide film, and patterns are locally formed in specific regions on at least one of front and back surfaces of the light guide film so that light is intensively supplied to predetermined regions of the keypad.

8. A light guide film for a keypad backlight to cause incident light from a light source to be surface-emitted, the light guide film comprising:
a reflection layer formed on a lower portion thereof,
wherein patterns are locally formed in specific regions on at least one of front and back surfaces of the light guide film so that light is intensively supplied to predetermined regions of the keypad;
wherein the light guide film is a slim film with a thickness in a range of 50 to 250 μm.

9. The light guide film as claimed in claim 8, wherein the light guide film and the reflection layer are spaced apart by a predetermined distance from each other.

10. The light guide film as claimed in claim 8, wherein the reflection layer is formed of a sheet and attached to one side end, both side ends or the entire of the back surface of the light guide film using a double-sided tape.

11. The light guide film as claimed in claim 8, wherein the patterns are formed by means of a hot press method using a mold heated to a temperature in a range of 70 to 150° C.

12. The light guide film as claimed in claim 8, wherein the patterns are formed by means of silk printing using an ink containing a light-scattering material on the light guide film.

13. The light guide film as claimed in claim 8, wherein the patterns have sizes increasing as the patterns go away from the light source.

* * * * *